United States Patent
Morad et al.

(10) Patent No.: US 8,677,547 B1
(45) Date of Patent: Mar. 25, 2014

(54) APPARATUS TO REMOVE A DISPOSABLE CLOTH FROM A HAND OPERATED SWEEPING MOP APPLICATOR WITHOUT HAVING TO TOUCH THE DISPOSABLE CLOTH

(71) Applicants: Fred I. Morad, Toluca Lake, CA (US); William P. Camp, Jr., Vanlue, OH (US); George Madres, La Crescenta, CA (US)

(72) Inventors: Fred I. Morad, Toluca Lake, CA (US); William P. Camp, Jr., Vanlue, OH (US); George Madres, La Crescenta, CA (US)

(73) Assignee: Worldwide Integrated Resources, Inc., Montebello, CA (US)

( * ) Notice: Subject to any disclaimer, the term of this patent is extended or adjusted under 35 U.S.C. 154(b) by 0 days.

(21) Appl. No.: 13/933,097

(22) Filed: Jul. 1, 2013

Related U.S. Application Data

(60) Provisional application No. 61/806,737, filed on Mar. 29, 2013.

(51) Int. Cl.
*A47L 13/20* (2006.01)
(52) U.S. Cl.
USPC .................. 15/228; 15/147.1; 15/147.2
(58) Field of Classification Search
USPC ................ 15/147.1, 147.2, 228, 231
See application file for complete search history.

(56) References Cited

U.S. PATENT DOCUMENTS

| | | | | |
|---|---|---|---|---|
| 5,926,896 | A * | 7/1999 | Allemann et al. | 15/147.2 |
| 7,418,758 | B1 * | 9/2008 | Avila | 15/119.2 |
| 8,166,597 | B2 * | 5/2012 | Levitt et al. | 15/118 |
| 8,341,795 | B2 * | 1/2013 | Michelson et al. | 15/119.2 |
| 8,464,391 | B2 * | 6/2013 | Bober et al. | 15/228 |
| 2002/0157201 | A1 * | 10/2002 | Katakura et al. | 15/104.94 |
| 2008/0040877 | A1 * | 2/2008 | Aiyar | 15/115 |
| 2013/0067673 | A1 * | 3/2013 | Yu | 15/228 |

* cited by examiner

*Primary Examiner* — Monica Carter
*Assistant Examiner* — Michael Jennings
(74) *Attorney, Agent, or Firm* — Thomas I. Rozsa

(57) ABSTRACT

A mop with a disposable cloth retaining assembly where the cloth is retained by cloth retaining members attached to the bottom of attaching plates on a main body, with a right and left cloth releasing plate between the main body and the cleaning cloth, the cloth releasing plates retained in a closed position against the main body by ratchet teeth engaged in notches of a respective notched collar to overcome a force of downward force compression springs. When a retaining force is removed, the downward spring force of force compression springs causes the cloth releasing plate to move away from the main body, the downward movement of the cloth releasing plate being limited. The cleaning cloth is separated from the cloth retaining members so that the dirty cleaning cloth falls away.

5 Claims, 15 Drawing Sheets

US 8,677,547 B1

APPARATUS TO REMOVE A DISPOSABLE CLOTH FROM A HAND OPERATED SWEEPING MOP APPLICATOR WITHOUT HAVING TO TOUCH THE DISPOSABLE CLOTH

This patent application claims priority to Application No. 61/806,737 filed on Mar. 29, 2013, now pending.

BACKGROUND OF THE INVENTION

1. Field of the Invention

The present invention relates to the field of hand operated sweeping mops which retain a disposable cleaning cloth.

2. Description of the Prior Art

In general, various types of hand operated sweeping mops are known in the prior art.

The hand operated sweeping mops include a generally rectangular shaped main body having an upper or top surface which includes a rotatable yolk attached to a collar having an opening which receives an elongated handle which is grasped by a user when operating the sweeping mop.

The main body also has a flat lower or bottom surface with a disposable cleaning cloth affixed to the sweeping mop applicator so that the disposable cleaning cloth is positioned under the lower or bottom surface and is retained onto the main body by various different retaining members.

In one retaining member configuration, the lower surface of the main body has hook and loop fasteners affixed to the lower surface and the disposable cleaning cloth is retained onto the lower surface of the main body by the hook and loop fasteners. In another configuration, the disposable cleaning cloth is retained onto the main body by several attachment members usually positioned on the upper surface on opposite sides of the yolk so that the disposable cleaning cloth is wrapped around the outer circumference of the main body and then attached by the attachment members to the sweeping mop.

One common problem with all prior art hand operated sweeping mop applicators also called flat mop applicators is that when the disposable cloth is very dirty after cleaning operations, the user must use at least one of his/her hands to grasp the dirty cleaning cloth and remove it from its attachment member on the sweeping mop applicator also called a flat mop applicator. Therefore, the user is exposed to the filth and dirt on the disposable cleaning cloth. There is a significant need for an improved apparatus which eliminates the requirement for a user to grasp the dirty cleaning cloth by hand when removing it from the sweeping mop applicator or flat mop applicator and replacing it.

SUMMARY OF THE INVENTION

The present invention is a hand operated sweeping mop applicator with a unique disposable cloth retaining assembly where the cloth is retained by cloth retaining members attached to the bottom of attaching members on the underside of the main body, with a pair of mirror image cloth releasing plates between the main body and the cleaning cloth (alternatively, they cam be formed as a single releasing plate), the cloth releasing plates retained in a closed position against the main body by ratchet teeth engaged in a notch of a respective notched collar in each cloth releasing plate to overcome a force of a downward force compression spring on each respective cloth releasing plate. This assembly is retained by a respective housing on the main body. When the respective button attached to a respective tooth is pressed down to overcome a biasing spring force which caused the teeth to be engaged with a respective notch, the downward spring force of each of the respective force compression springs causes a respective cloth releasing plate to move away from the main body. A guide pin having an elongated collar and widened base portion is inserted through a hollow interior chamber in each notched collar. The guide pin elongated collar extends through a top of the notched collar and is retained in a stationary position by a transverse retaining pin extending through an opening in the elongated collar and terminating within an opening in the housing retaining the assembly. The downward movement of each respective cloth releasing plate is limited by the widened base portion of a guide pin coming in contact with a lower interior surface of each respective notched collar within each housing. The distance moved by the notched collar of each cloth releasing plate is sufficient to separate the cleaning cloth from the cloth retaining members so that the dirty cleaning cloth falls away into a trash receptacle without requiring a user to handle the dirty cloth.

It is an object of the present invention to provide a mechanism on a hand operated sweeping mop applicator which retains a cleaning cloth in a manner which enables the cleaning cloth after it has been used and becomes dirty to be released and fall into a trash receptacle without the necessity of a user's hand touching the dirty cleaning cloth.

It is also an object of the present invention to provide a mechanism for a hand operated sweeping mop applicator which includes a spring force to push downwardly on a cloth releasing plate to enable the dirty cleaning cloth to be separated from the engagement members which retain the cleaning cloth onto the main body of the sweeping mop applicator so that the connection is released, enabling the cleaning cloth to be released without requiring a human hand to touch a dirty cleaning cloth.

It is an additional object of the present invention to provide a mechanism which limits the downward travel of a cloth releasing plate so that it will not fall away from the main body of the sweeping mop applicator.

It is a further object of the present invention to provide ratchet teeth retaining members to prevent the force compression springs from causing the cloth releasing plate to move downwardly to release the cloth from its retaining members until the ratchet teeth retaining members are manually released.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claim.

Figure 1:
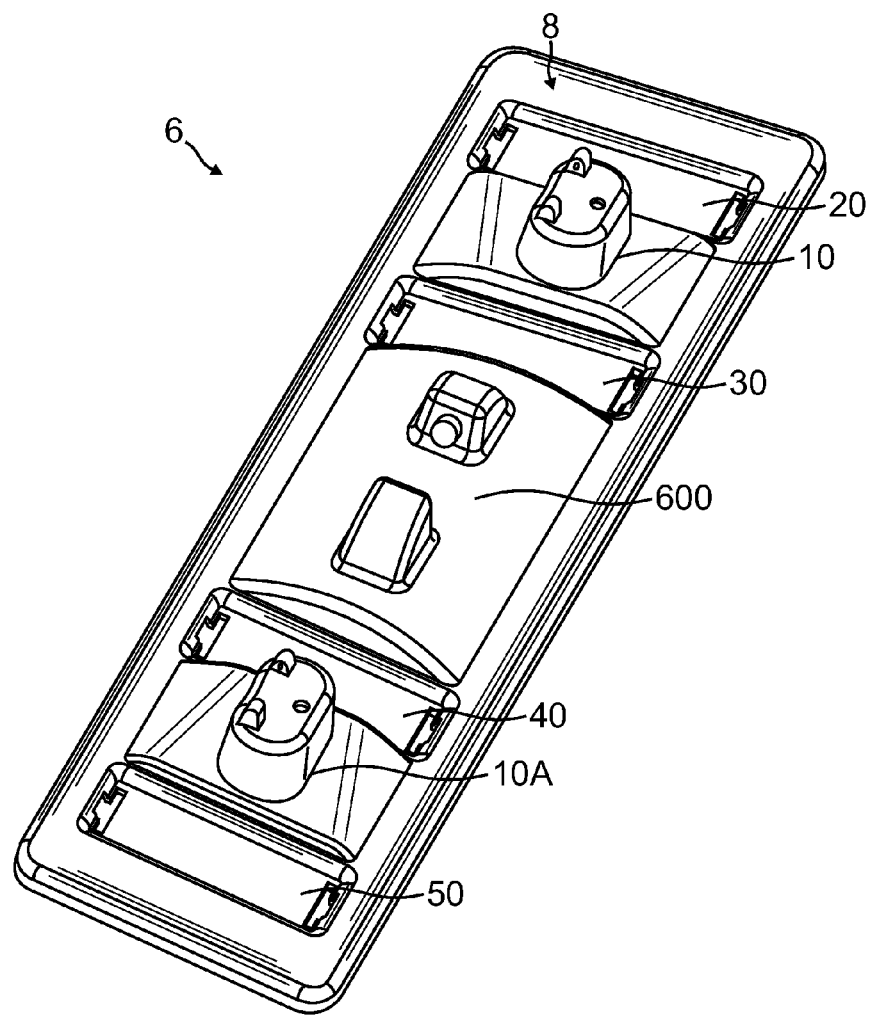
FIG. 1 is a top perspective view of the present invention main body of a hand operated sweeping mop applicator illustrating the retainer for a rotatable yolk which retains a collar into which an elongated handle is retained (the yolk, collar and handle not shown as they are conventional portions known in the prior art), also illustrating the top sections having disposable cloth retaining members on their respective bottom surfaces and illustrating the two housings for respectively retaining a notched collar and spring retaining posts.

Referring to FIG. 1, there is illustrated a top perspective view of the present invention main body 8 of a hand operated sweeping mop applicator 6 illustrating the retainer 600 for a rotatable yolk which retains a collar into which an elongated handle is retained. The rotatable yolk, collar and handle are not shown as they are conventional portions known in the prior art. Also illustrated in FIG. 1 are the top sections of the disposable cloth retaining members 20, 30, 40 and 50, having disposable cloth retaining members on their respective bottom surfaces. While four disposable cloth retaining members are illustrated, it will be appreciated that any multiplicity of disposable cloth retaining members are within the spirit and scope of the present invention, as long as there are at least two disposable cloth retaining members, at least one disposable cloth retaining member on opposite sides of the retainer 600 for a rotatable yolk. Also illustrated are a pair of housings 10 and 10A for retaining the operational mechanisms of the present invention.

Figure 1A:
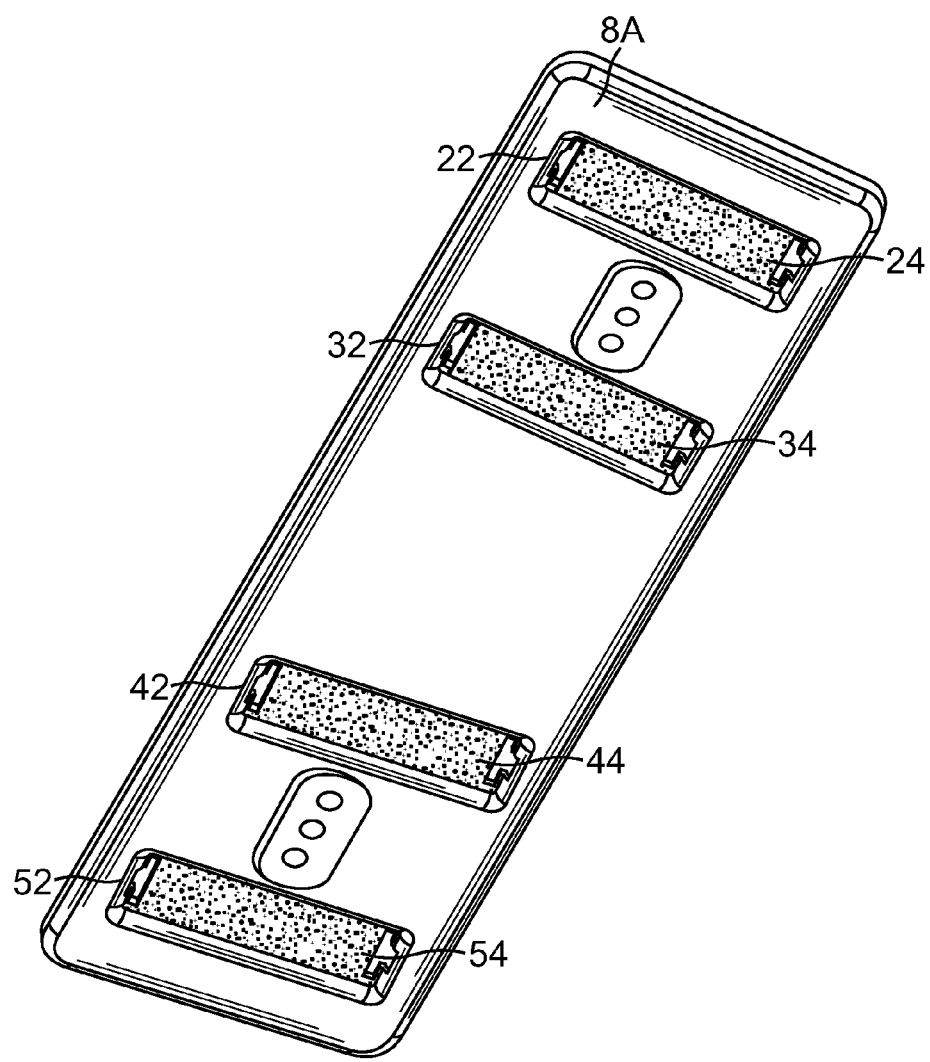
FIG. 1A is a bottom perspective view of the main body illustrated in FIG. 1.

Referring to FIG. 1A which illustrates the bottom perspective view of the main plate 8, the total bottom surface 8A has respective bottom surface 22, 32, 42 and 52 having cloth retaining members 24, 34, 44 and 54 respectively affixed to bottom surfaces 22, 32, 42 and 52. Each bottom surface 22, 32, 42 and 52 respectively corresponds to a top surface 20, 30, 40 and 50. In a preferred embodiment, each cloth retaining member 24, 34, 44 and 54 is a hook fastener, known as a portion of a Velcro® hook and loop fastener. The retained disposable cloth 500 has the mating loop fasteners. The disposable cloth is selected from the group consisting of microfiber cloth, non-woven cloth or chamois cloth.

Figure 2:
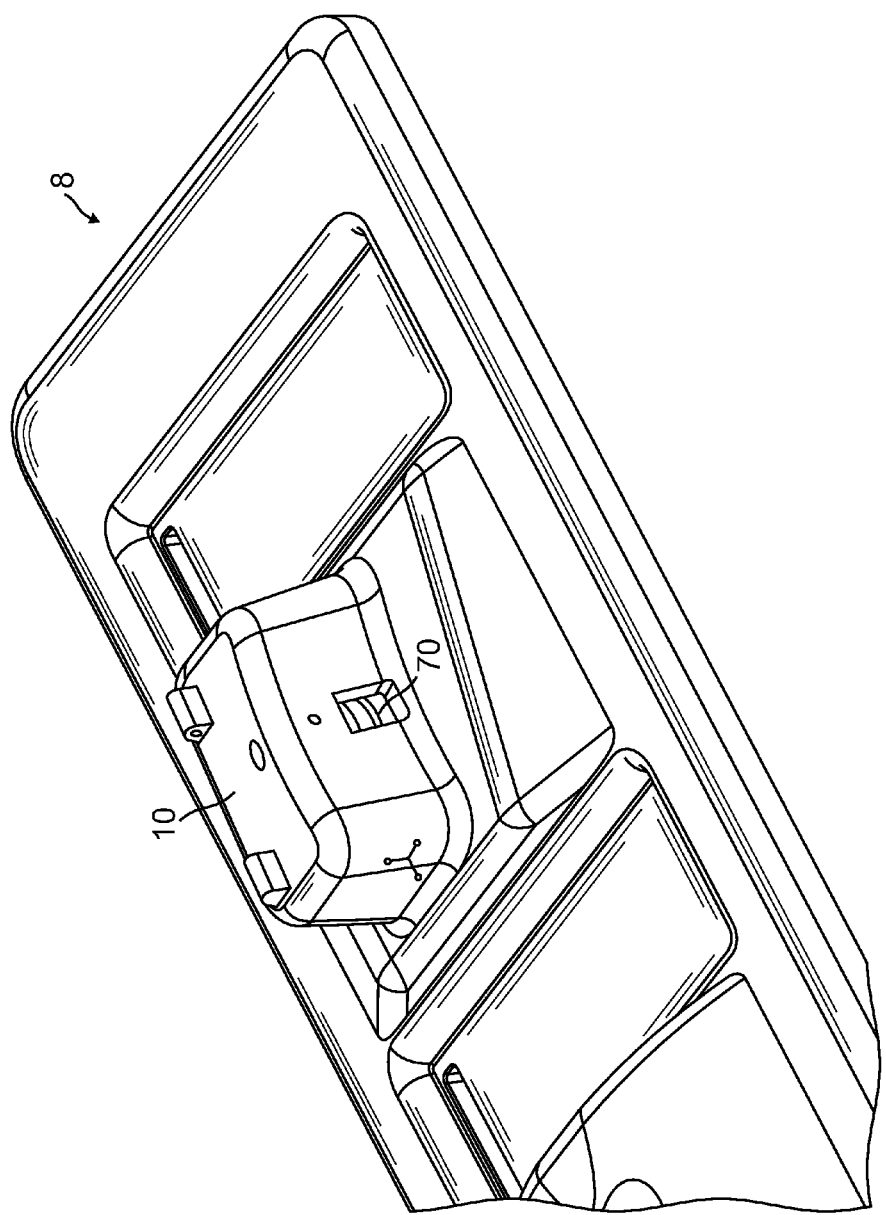
FIG. 2 is a top perspective view of a portion of the first or right half of the main body illustrated in FIG. 1, illustrating the first or right housing retaining a notched collar.

Referring to FIG. 2, there is illustrated a top perspective view of a portion of the first or right half of the main body 8 illustrated in FIG. 1, illustrating the first or right housing 10 retaining a notched collar 70.

Figure 3:
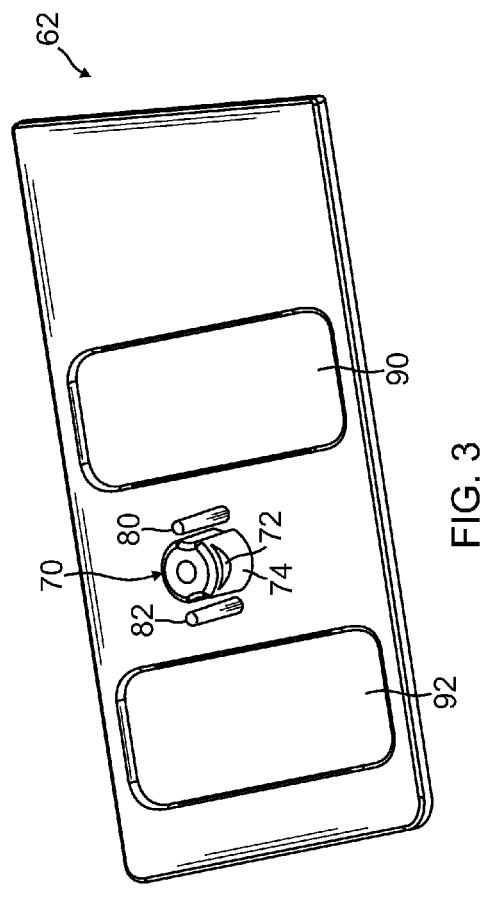
FIG. 3 is a top perspective view of the right cloth releasing plate, illustrating a right notched collar and a pair of spring retaining posts on opposite sides of the right notched collar.
Figure 4:
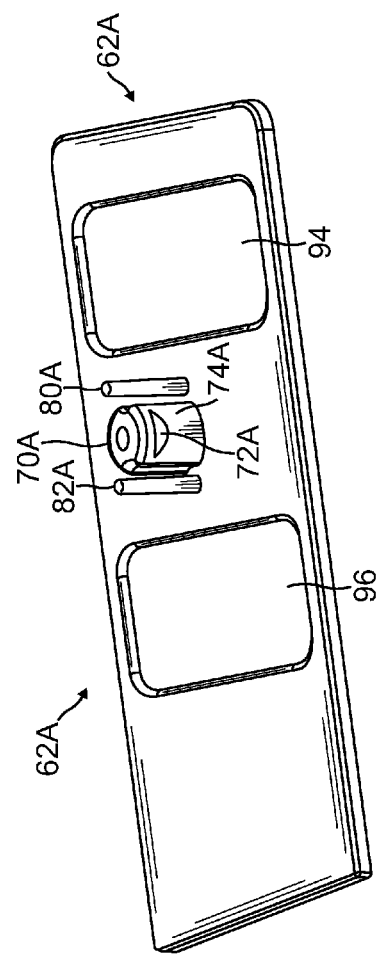
FIG. 4 is a top perspective view of the left cloth releasing plate, illustrating a left notched collar and a pair of spring retaining posts on opposite sides of the left notched collar.

In one embodiment, the present invention has two cloth releasing plates which operate independently of each other. Referring to FIG. 3, there is illustrated a top perspective view of a first or right cloth releasing plate 62, illustrating a first or right notched collar 70 and a pair of spring supporting pins 80 and 82 on opposite sides of the notched collar 70. The notched collar 70 has a sidewall 74 with a notch 72 into which a retaining tooth can be inserted. The right cloth releasing plate 62 has a pair of openings 90 and 92 which are respectively sized to encircle the bottom of each respective cloth retaining member 20 and 30. Referring to FIG. 4, there is illustrated a second or left cloth releasing plate 62A illustrating a second or left notched collar 70A and a pair of spring supporting pins 80A and 82A on opposite sides of the notched collar 70A. The notched collar 70A has a sidewall 74A with a notch 72A into which a retaining tooth can be inserted. The left cloth releasing plate 62A has a pair of openings 94 and 96 which are respectively sized to encircle the bottom of each respective cloth retaining member 40 and 50. Right cloth retaining plate 62 and left cloth releasing plate 62A are mirror images of each other.

Figure 4A:
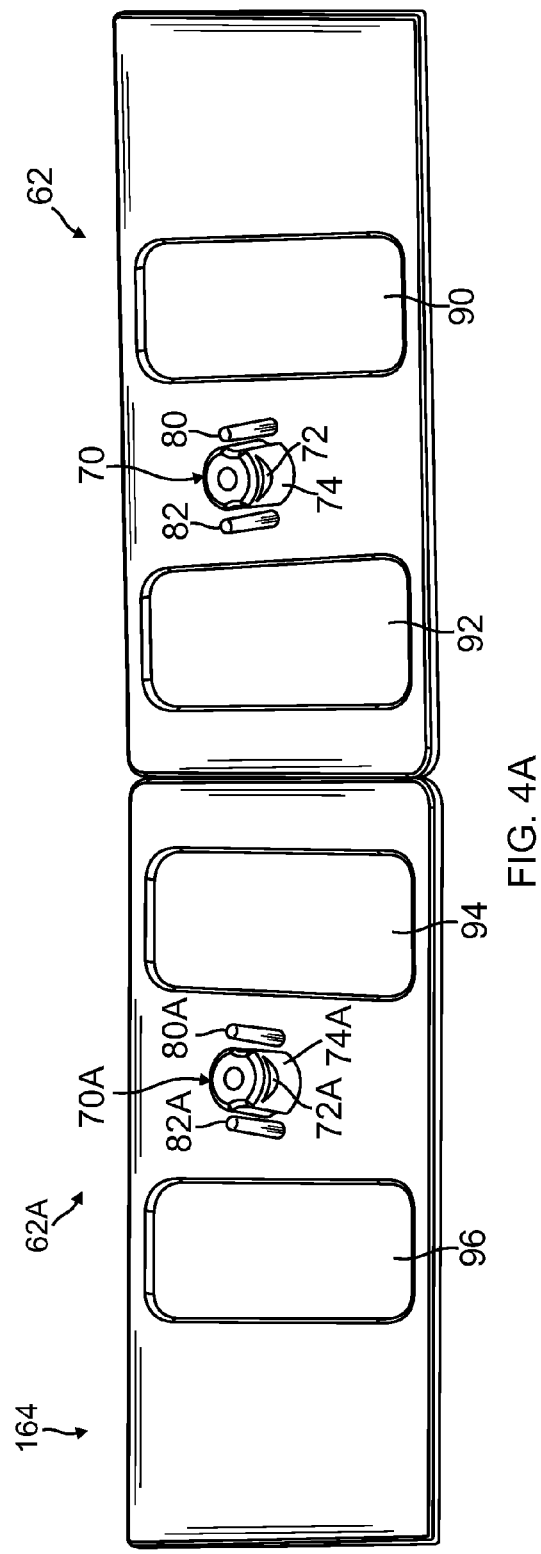
FIG. 4A is a top perspective view of the left and right cloth releasing plates shown together.
Figure 4B:
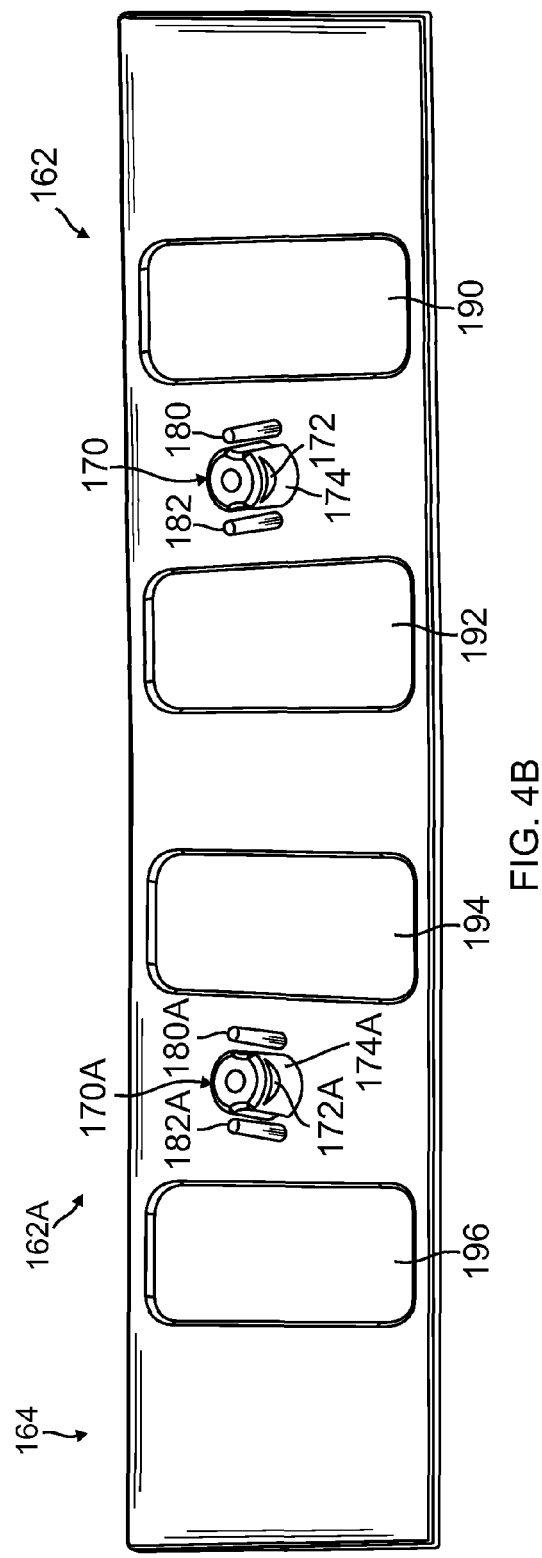
FIG. 4B is a top perspective view of the left and right clothing releasing plates formed in one piece.

In an alternative embodiment, the present invention has a single cloth releasing plate which operate together. Referring to FIG. 4A, there is illustrated a top perspective view of the right section 162 of a single cloth releasing plate 164, illustrating a first or right notched collar 170 and a pair of spring supporting pins 180 and 182 on opposite sides of the notched collar 170. The notched collar 170 has a sidewall 174 with a notch 172 into which a retaining tooth can be inserted. The right section cloth releasing plate 162 has a pair of openings 190 and 192 which are respectively sized to encircle the bottom of each respective cloth retaining member 20 and 30. There is illustrated a second or left section 162A of the single piece cloth releasing plate 164 illustrating a second or left notched collar 170A and a pair of spring supporting pins 180A and 182A on opposite sides of the notched collar 170A. The notched collar 170A has a sidewall 174A with a notch 172A into which a retaining tooth can be inserted. The left section 162A of cloth releasing plate 164 has a pair of openings 194 and 196 which are respectively sized to encircle the bottom of each respective cloth retaining member 40 and 50. The right section 162 of single piece cloth retaining plate 164 and left section 162A of single piece cloth releasing plate 164 are mirror images of each other.

Figure 5:
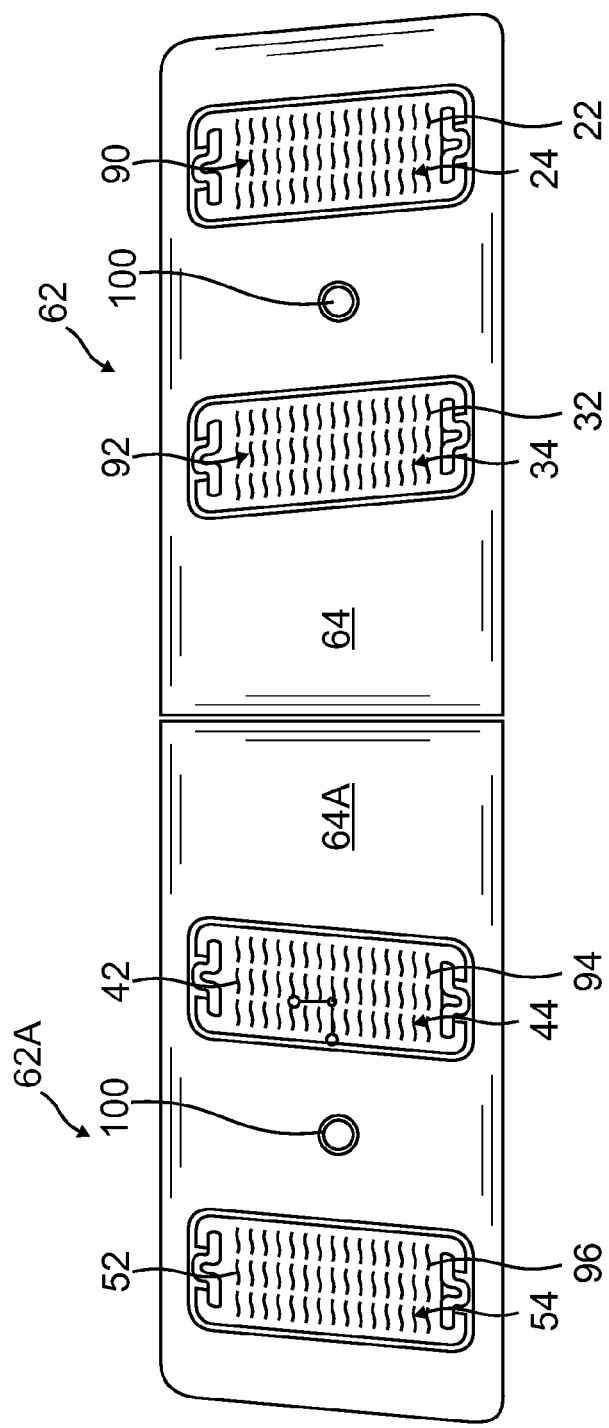
FIG. 5 is a bottom perspective view of the right and left cloth releasing plates formed in two pieces.

Referring to FIG. 5, there is illustrated a bottom perspective view of the right and left cloth releasing plates 62 and 62A. The view from the bottom 64 of the right cloth releasing plate 62 illustrates the two openings 90 and 92, respectively aligned to respectively encircle the respective bottom surfaces 22 and 32 of the cloth retaining members 20 and 30. The view from the bottom 64A of the left cloth releasing plate 62A illustrates the two openings 94 and 96, respectively aligned to respectively encircle the respective bottom surfaces 42 and 52 of cloth retaining members 40 and 50. Each respective bottom surface 22, 32, 42 and 52 has cloth retaining members 24, 34, 44 and 54 respectively affixed to bottom surfaces 22, 32, 42 and 52. The cloth releasing members 24, 34, 44 and 54 come in contact with a cloth 500 positioned adjacent the bottoms 64 and 64A through aligned openings 90, 92, 94 and 96. In a preferred embodiment, each cloth retaining member 24, 34, 44 and 54 is a hook fastener, known as a portion of a Velcro® hook and loop fastener. The retained disposable cloth 500 has the mating loop fasteners. The disposable cloth is selected from the group consisting of microfiber cloth, non-woven cloth or chamois cloth. If the cloth 500 is microfiber cloth, positioning it adjacent the bottom surfaces 62A and 64A is sufficient for the cloth to come in contact with the retaining members 24, 34, 44 and 54. If the cloth is non-woven cloth or chamois cloth, it needs to be wrapped around releasing plates 60 and 60A to come in contact with the retaining members 24, 34, 44, and 54.

Figure 5A:
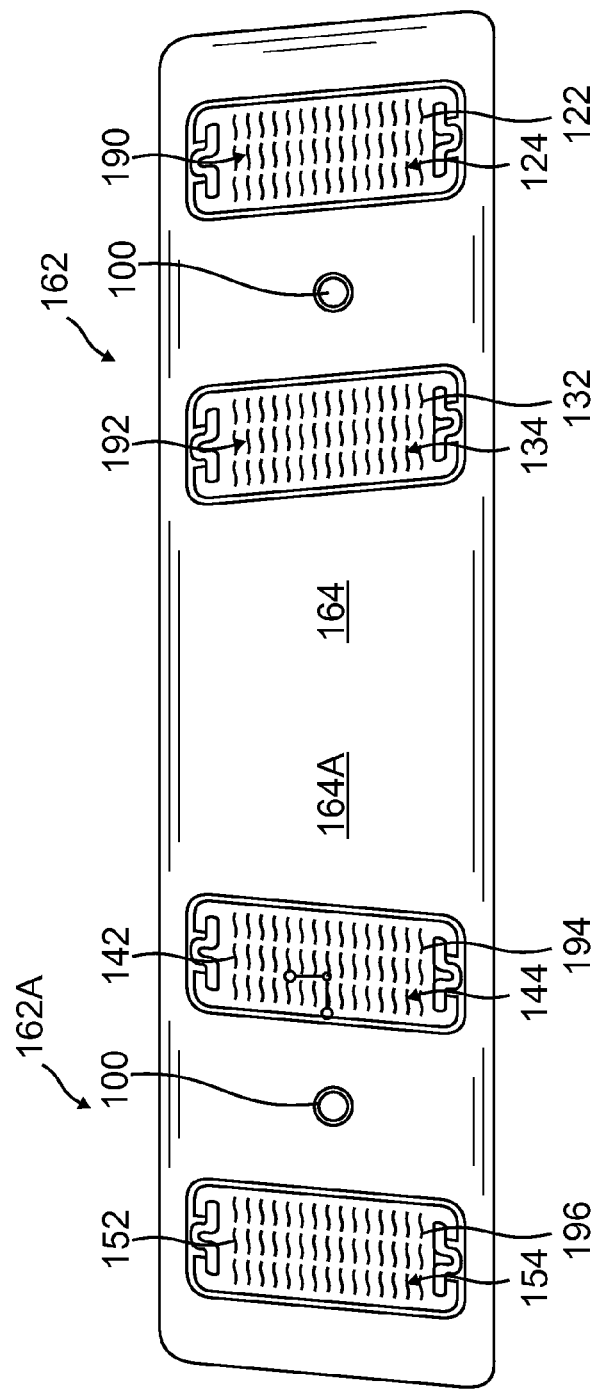
FIG. 5A is a bottom perspective view of a one piece cloth releasing plate.

Referring to FIG. 5A, there is illustrated a bottom perspective view of the single piece cloth releasing plate 164 including the right section 162 and left section 162A. The view from the bottom 164A of the cloth releasing plate 164 illustrates the right section 162 and the two openings 190 and 192, respectively aligned to respectively encircle the respective bottom surfaces 22 and 32 of the cloth retaining members 20 and 30. The view from the bottom 164A of the single piece cloth releasing plate 164 also illustrates the left section 162A with the two openings 194 and 196, respectively aligned to respectively encircle the respective bottom surfaces 42 and 52 of cloth retaining members 40 and 50. Each respective bottom surface 22, 32, 42 and 52 has cloth retaining members 24, 34, 44 and 54 respectively affixed to bottom surfaces 22, 32, 42 and 52. The cloth releasing members 24, 34, 44 and 54 come in contact with a cloth 500 positioned adjacent bottom surface 164A through aligned openings 190, 192, 194 and 196. In a preferred embodiment, each cloth retaining member 24, 34, 44 and 54 is a hook fastener, known as a portion of a Velcro® hook and loop fastener. The retained disposable cloth 500 has the mating loop fasteners. The disposable cloth is selected from the group consisting of microfiber cloth, non-woven cloth or chamois cloth. If the cloth 500 is microfiber cloth, positioning it adjacent the bottom surface 164A is sufficient for the cloth to come in contact with the retaining members 24, 34, 44 and 54. If the cloth is non-woven cloth or chamois cloth, it needs to be wrapped around releasing plate 164 to come in contact with the retaining members 24, 34, 44, and 54.

Figure 6:
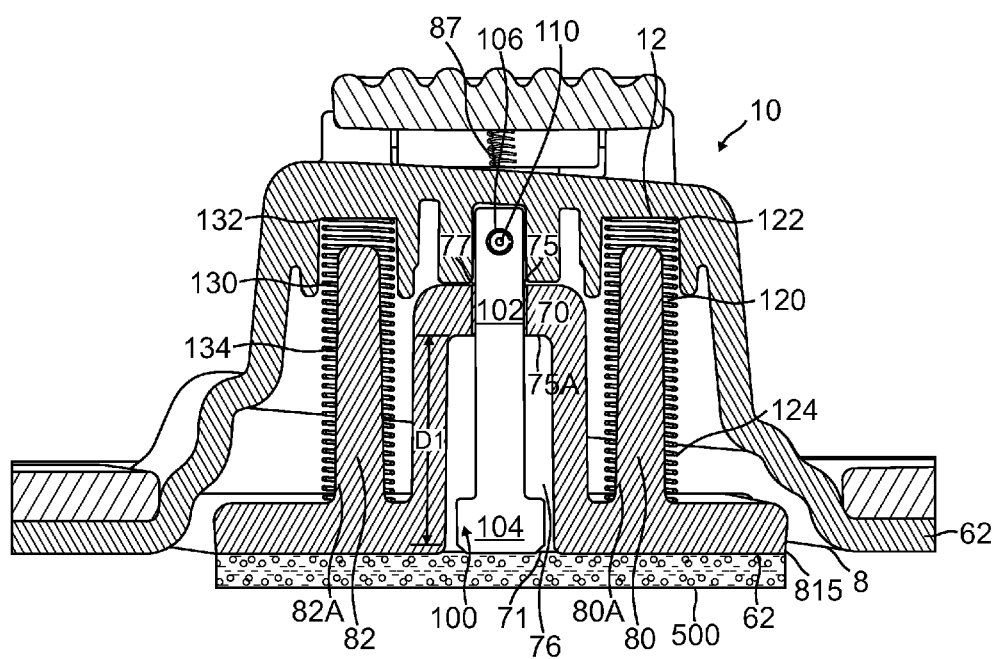
FIG. 6 is a cross-sectional view of a housing for retaining the right notched collar and spring retaining posts on a portion of the right cloth releasing plate, right compression force springs. and a central movement stopping assembly engaged to retain a disposable wiping cloth against the bottom surfaces of the right cloth releasing plate.

Referring to FIG. 6, there is illustrated a cross-sectional view of a housing 10 for retaining a notched collar 70 and spring supporting pins 80 and 82 on a portion of the right cloth releasing plate 62, and a central guide pin 106 inserted through a longitudinal interior chamber 76 in the notched collar 70, the longitudinal opening 76 extending from the bottom 71 of notched collar 70 to the interior surface 75A of top 75 of notched collar 70. The top 75 of notched collar 70 has a central opening 77 extending from interior surface 75A through top 75. The central guide pin 100 includes a longitudinal collar 102 and a bottom extended base 104 aligned with the bottom 71 of notched collar 70. The longitudinal collar 102 of the central guide pin 100 has a transverse opening 106 to receive a transverse retaining pin 110 illustrated in FIGS. 9 and 10 which retains the central guide pin 100 in a fixed position. The given distance from the bottom 71 of notched collar 70 to the interior surface 75A of the top 75 of notched collar 70 is "D1", which given distance in a preferred embodiment is three quarters (¾) of an inch to one (1) inch. The notched collar 70 has an open interior chamber 76 so that right cloth releasing plate 62 is movably retained around central guide pin 100. Each spring supporting pin 80 and 82 has a respective collar 80A and 82A to enable each spring retaining pin 80 and 82 to better support a compression force spring. FIG. 6 illustrates the right cloth releasing plate 62 retained against the bottom 8A of main body 8 by engagement of a ratchet tooth into a respective notch such as 72. This is referred to as the engaged position.

Figure 7:
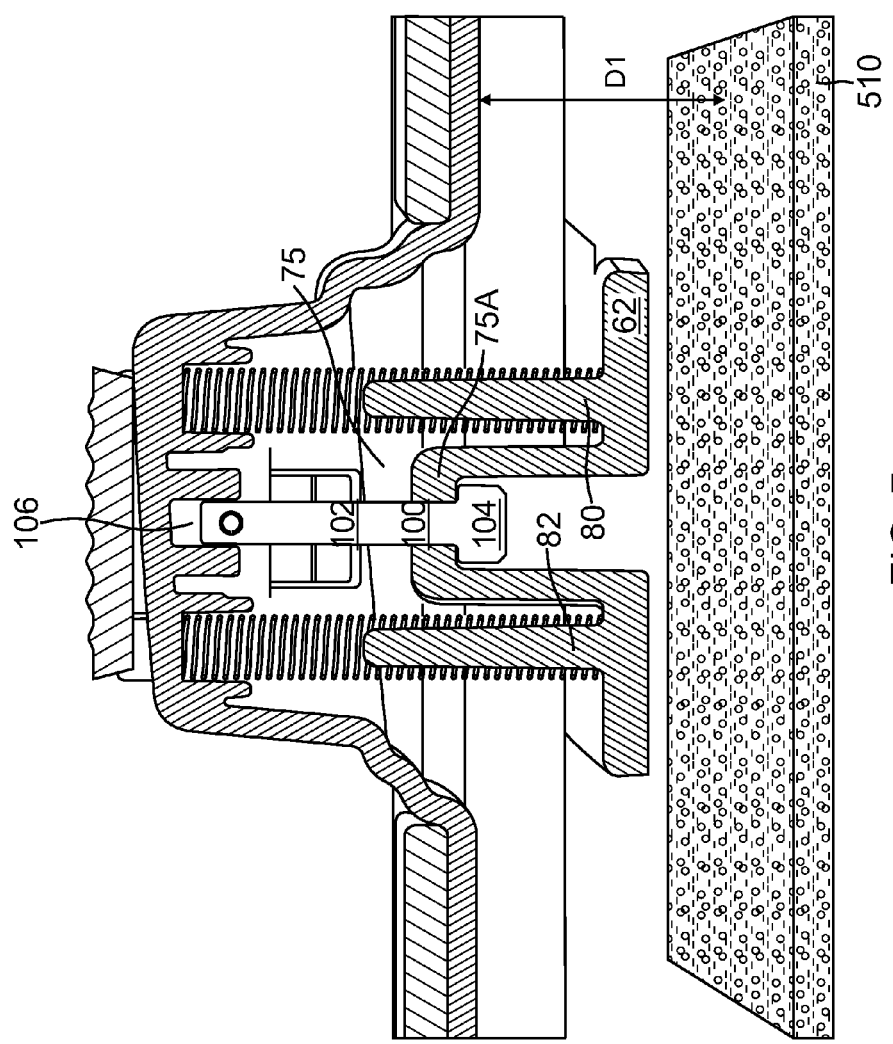
FIG. 7 is a cross-sectional view of a housing for retaining the notched collar and spring retaining posts on a portion of the right cloth releasing plate, right compression force springs and a central movement stopping assembly disengaged to release and enable the right cloth releasing plate to move downwardly by the force of the right compression force springs and releasing the disposable wiping cloth so that it can fall away from the bottom surfaces of the right cloth releasing plate.

FIG. 7 illustrates the same component as FIG. 6 but with the ratchet tooth released so that the pair of compression force springs release the right cloth releasing plate 62 to move away from the bottom 8A of main plate 8. The downward movement of the right cloth releasing plate 62 is stopped when the notched collar travels downwardly by the given distance "D1" and transverse base 104 of stationary guide pin 100 abuts the bottom surface 75A of top 75 of the notched collar 70. In this way, the right cloth releasing plate does not entirely fall away from the main body 8.

It will be appreciated that the left cloth releasing plate 62A has the same components as discussed in FIGS. 6 and 7 for the right cloth releasing plate 62. If a single releasing plate 164 is used, the same configuration is used with the right section 162 and left section 162A Referring further to FIG. 6 which is a cross-sectional view of the housing and the components therein, it further includes a first compression force spring 120 affixed at its top end 122 to an interior top surface 12 of housing 10 and supported at its bottom area 124 by collar 80A and spring retaining pin 80. Similarly, a second compression force spring 130 is affixed at its top end 132 to the interior top surface 12 of housing 10 and supported at its bottom area 134 by collar 82A and spring retaining pin 82. Transverse opening 106 in collar 102 of guide pin 100 is also illustrated.

Figure 8:
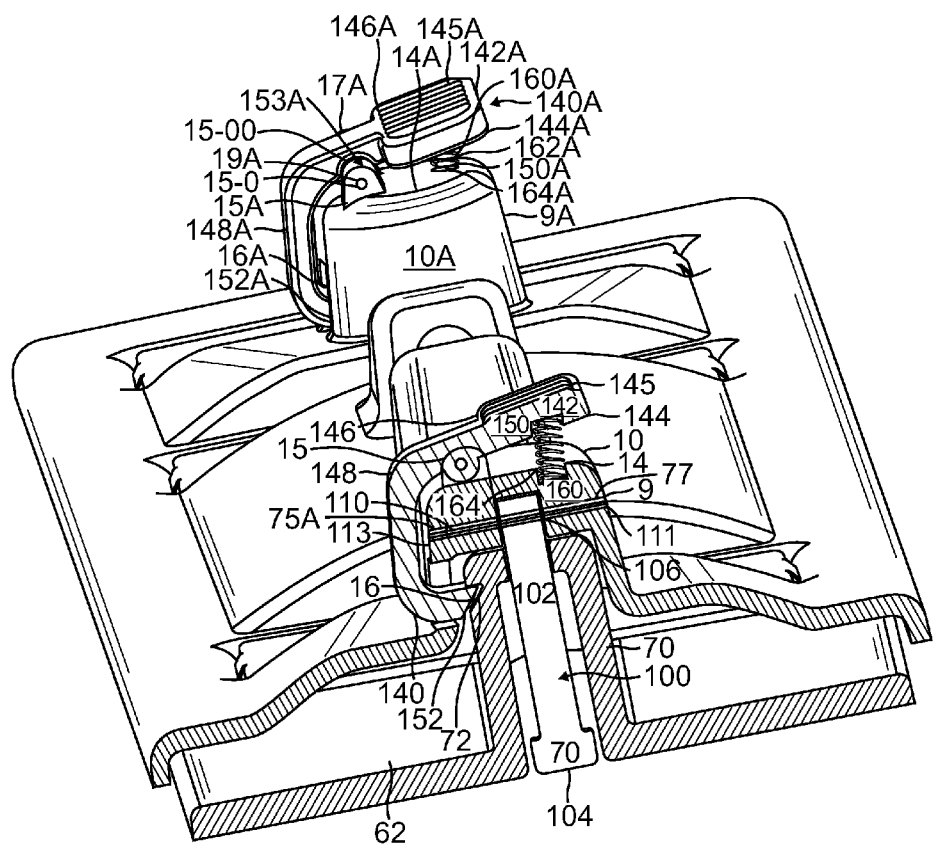
FIG. 8 is a side perspective view of the pair of housing members with a respective pair of spring biased retaining teeth which engage a notch of a respective notched collar to retain the cloth releasing plate onto the bottom of the main body and a central guide pin inserted through the notched collar of a portion of a spring biased retaining tooth also called a trigger member.

Referring to FIG. 8, there is respectively illustrated a side perspective view of the pair of housing members 10 and 10A with a respective pair of spring biased retaining teeth 152 and 152A, spring biased retaining tooth 152 which engages a notch 72 of notched collar 70 to retain the right cloth releasing plate 62 onto the bottom surface 8A of the main body 8 and spring biased retaining tooth 152A which engages a notch 70A of notched collar 72A to retain the left cloth releasing plate 62A onto the bottom surface 8A of main body 8. The same mechanism is used on a right section 162 and left section 162A of a single piece cloth releasing plate 164.

Figure 9:
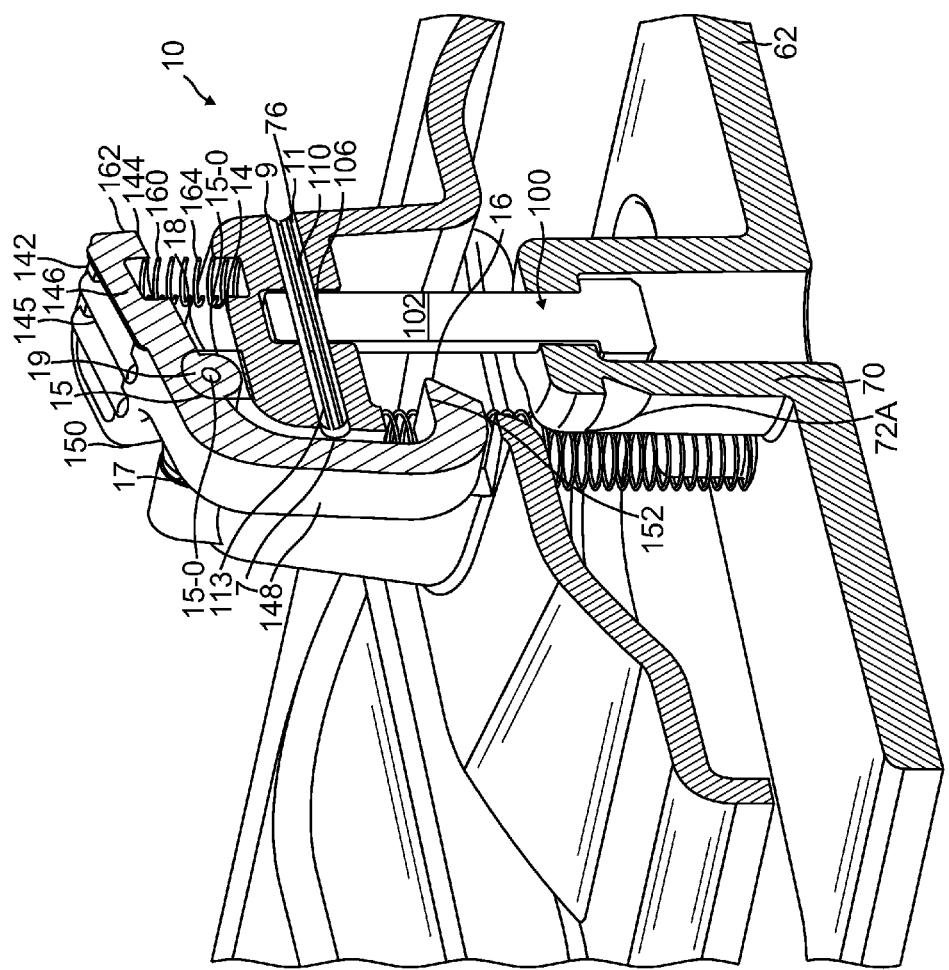
FIG. 9 is an open perspective view of a housing for retaining the notched collar and a compression force spring and the central guide pin inserted through the notched collar with a transverse retaining pin extending through the collar central guide pin, all on a portion of the cloth releasing plate in the disengaged position.
Figure 10:
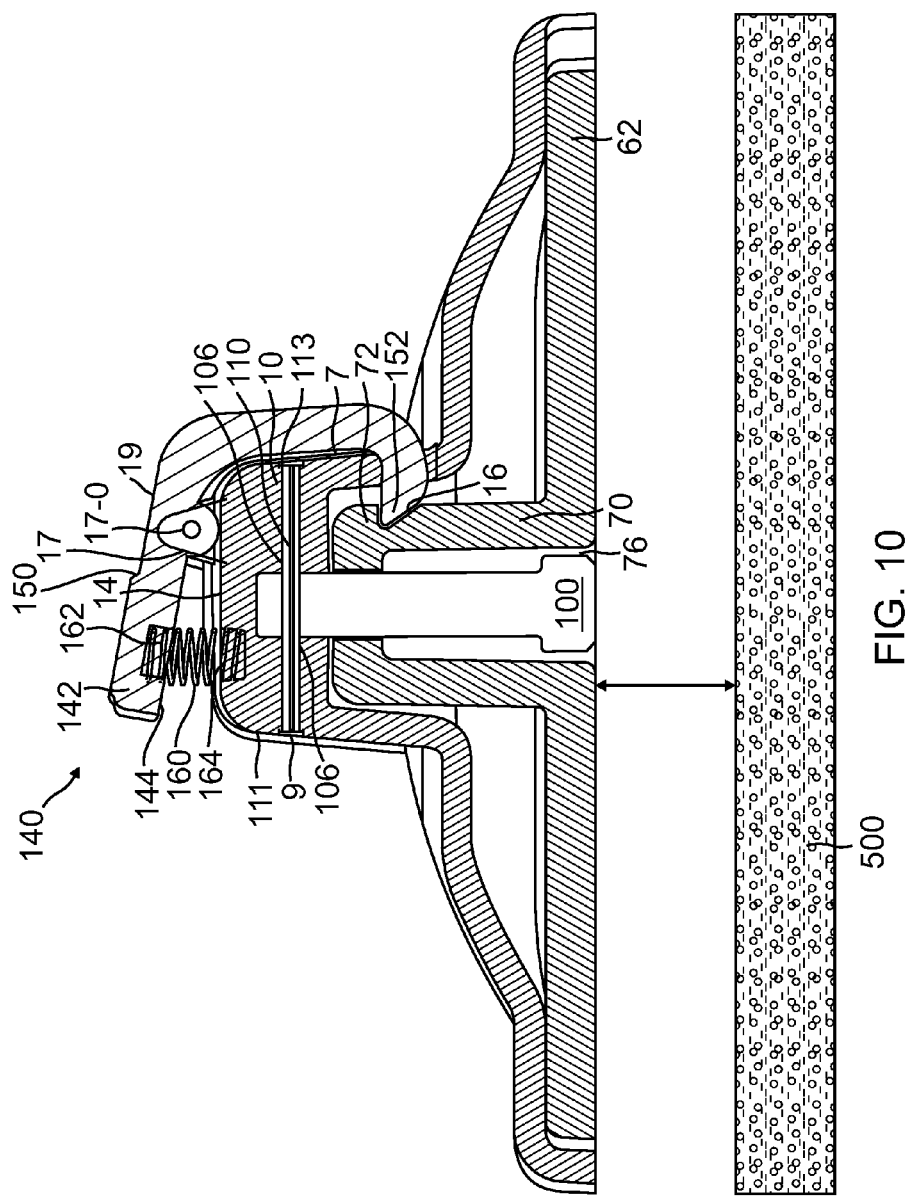
FIG. 10 is a cross-sectional view of a housing for retaining the notched collar, a central guide pin and a spring biased retaining tooth engaging a notched collar, also illustrating the pivoting assembly by which the tooth engaging assembly rotates.
Figure 11:
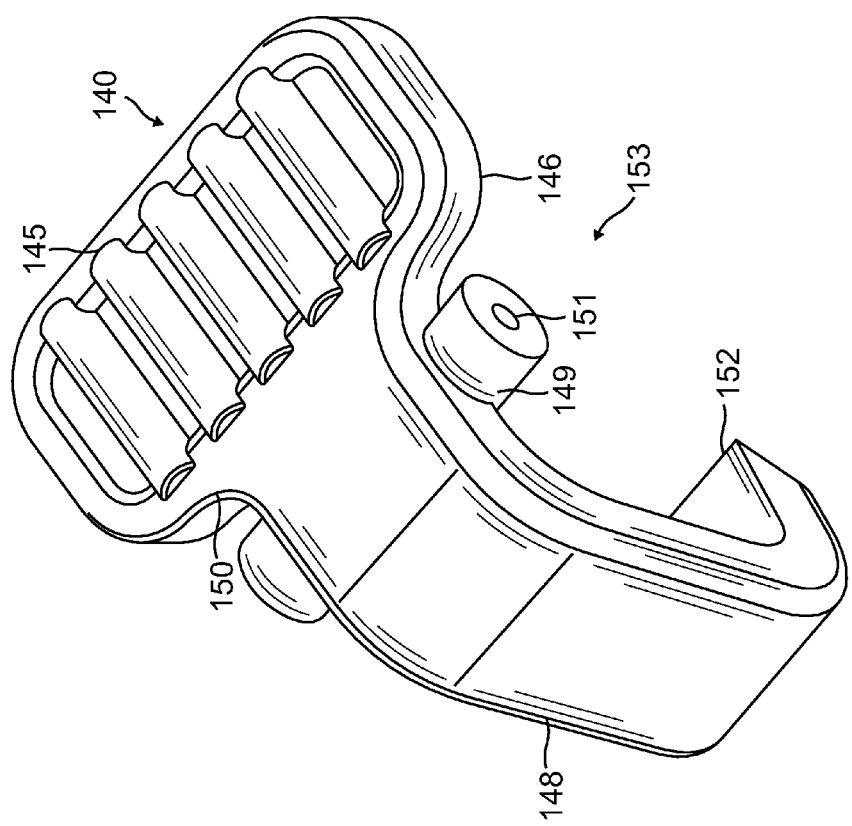
FIG. 11 is a top perspective view of the trigger mechanism.
Figure 12:
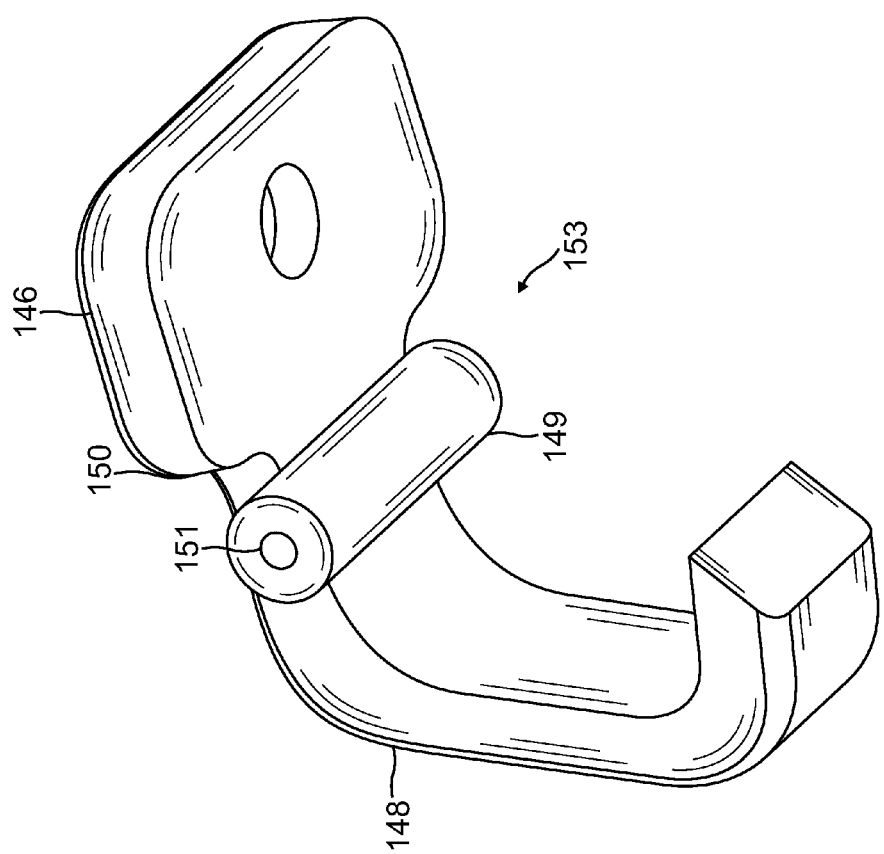
FIG. 12 is a bottom perspective view of the trigger mechanism.

Referring to FIGS. 9 and 10, there is respectively illustrated an open perspective view of a housing 10 and a side view of the housing 10 for retaining the notched collar 70 and the transverse retaining pin 110 inserted through the transverse opening 106 in the longitudinal collar 102 of central guide pin 100 which extends through the notched collar 70 on a portion of the right cloth release plate 62 and which transverse retaining pin 110 terminates at its outer end 111 in opening 9 of housing 10 and abuts interior housing wall 7 at transverse retaining pin's opposite end 113.

Referring to FIGS. 8, 9, 10, 11 and 12, there is also illustrated a first retaining trigger mechanism assembly 140 comprising a press button 142 having a bottom surface 144 affixed to a first biasing spring 160 at its top end 162, the first biasing spring 160 affixed at its bottom end 164 to the top surface 14 of housing 10 and the press button 142 having a top surface 145 and a sidewall 146, a bent arm 148 affixed at a proximal end 150 to sidewall 146, the bent arm 148 terminating at its distal end in an engaging tooth 152 which extends through a transverse opening 16 in housing 10 and engages notch 72 in notched collar 70. As illustrated in. FIGS. 9 and 10, the top of housing 10 contains a pair of pivot posts 15 and 17 which retains pin 19 which respectively extends through opening 15-0 and 17-0 of pivot posts 15 and 17 and referring to FIG. 11, extends through pin opening 151 of pivot collar 149 which in incorporated into bent arm 148 and which acts as a pivot point 153 for the first retaining trigger mechanism 140.

Similarly, referring to FIG. 8, there is also illustrated a second retaining trigger mechanism 140A comprising a press button 142A having a bottom surface 144A affixed to a second biasing spring 160A at its top end 162A, the second biasing spring 160A affixed at its bottom end 164A to the top surface 14A of second housing 10A and the press button 142A having a top surface 145A and a sidewall 146A, a bent aim 148A affixed at a proximal end 150A to sidewall 146A, the bent aim 148A terminating at its distal end in an engaging tooth 152A which extends through a transverse opening 16A in second housing 10A and engages a notch 72A in corresponding notched collar 70A within second housing 10A. The top 14A of the second housing 10A also includes a pair of pivot posts 15A and 17A which retains in pin 19A which respectively extends through openings (only 15-00 is shown) of pivot posts 15A and opposite post extends through the pin opening of the second pivot which in incorporated into bent arm 148A and which acts as a pivot point 153A for the second retaining trigger mechanism 140A.

Referring to FIG. 10, there is also illustrated a cross-sectional view of a housing 10 for retaining the notched collar 70 to right cloth releasing plate 62 and a central guide with a shaft portion 102 extending within an interior chamber 76 of notched collar 70 with transverse retaining pin 110 extending through an opening 106 in the shaft portion 102 of central guide pin 100 terminating at its opposite ends as previously described and a spring biased trigger assembly 140 engaging a notch 72A in notched collar 70 in the manner previously described.

Referring to FIG. 6, there is illustrated a cross-sectional view of the engaged and retained configuration of the present invention apparatuses illustrating a disposable cloth 500 retained onto the bottom of the cloth releasing plates 60 by the attaching members such as 22 and 32 of attaching plates 20 and 30.

Referring back to FIG. 7, there is illustrated a cross-sectional view of the disengaged and released configuration of the present invention apparatuses illustrating a dirty disposable cloth 510 removed from the bottom of the right cloth releasing plate 62 so that it is disposed of without a person's hand touching the dirty disposable cleaning cloth.

In operation, a cleaning cloth 500 which, by way of example, is a microfiber cleaning cloth or a chamois cloth or a non-women cloth is affixed against the bottoms 64 and 64A of the respective right and left cloth releasing plates 62 and 62A and is retained by the retaining members 24, 34, 44 and 54 on the respective bottom surfaces 22, 32, 42 and 52 of retaining members 20, 30, 40 and 50 such as hook members of a hook and loop fastener by extending through the openings 90, 92, 94 and 96 of respective cloth releasing plates 62 and 62A so that the microfiber cleaning cloth 500 comes in contact with and is retained by the retaining members 24, 34, 44 and 54.

The hand operated sweeping mop applicator 8 is ready for cleaning operations. The spring biased trigger mechanisms 140 and 140A have their respective engaging teeth 152 and 152A engaging a notch such as 72 in notched collar 70 in first housing 10 and notch 72A in notched collar 70A in second housing 10A. The teeth 152 and 152A respectively engage the notches such as 72 and 72A by the force of respective biasing springs 160 and 160A pushing on press buttons 142 and 142A to overcome the downward force of compression force springs 120 and 130. The sweeping mop applicator 6 is used with the cleaning cloth rubbed against a surface such as a floor to remove dust, dirt, etc. When the cleaning cloth becomes a dirty cleaning cloth 510, it is necessary to replace it. Thumbs of the left and right hand press down on the top surfaces 144 and 144A of press buttons 142 and 142A to overcome the force of biasing springs 160 and 160A rotating about pivot points 153 and 153A causing the bent arm sections 148 and 148A to rotate in a clockwise direction so that engaging teeth 152 and 152A are disengaged from a notches 72 and 72A.

As a result of the disengagement of the engaging teeth from respective notches on respective notched collars, the compression force springs 120 and 130 exert a downward force on the right cloth releasing plate 62, and corresponding compression force springs exert a downward force on left cloth releasing plate 62A, the downward force stopped by the respective transverse bottom 104 of guide pin 100 abutting the interior surface 75A of the top 75 of notched collar 70 and a corresponding second such assembly in second housing 10A so that cloth releasing plates 62 and 62A are moved apart from the main plate 8. The downward travel distance is D1 such as three-quarters (¾) of an inch to one (1) inch. As a result, the dirty cleaning cloth 510 is disengaged from the cloth retaining members 24, 34, 44 and 54 and falls away from the cloth releasing plates 62 and 62A and into a wastebasket without the user's hands ever touching the dirty cleaning cloth 510.

While the above invention has been described in the Detailed Description of the Preferred Embodiment in great detail, it will be appreciated that it is within the spirit and scope of the present invention to include additional variations with the present invention. Specifically, the cloth releasing plates 62 and 62A have been described as two separate plates. It will be appreciated that it is within the spirit and scope of the present invention to have a single cloth releasing plate which essentially is the same as the two but are combined together as one plate having the same openings 90, 92, 94 and 96 and the two notched collars 70 and 70A, but simply affixed to a single plate rather than two separate plates. Also, the bottom then will be a single plate where the bottom surfaces containing the openings surrounding the engaging members are on a single plate, rather than two separate plates.

In addition to the disposable cloth being engaged by retaining members on the bottom of the main plate, there is a second variation wherein the disposable cloth instead is wrapped around the cloth releasing plate, whether it be two cloth releasing plates 62 and 62A as illustrated in the preferred embodiment or a single cloth releasing plate as discussed above and will be wrapped around the outer circumference of the cloth releasing plate and trapped against the main body 8 so that when the trigger mechanism is engaged, the disposable cloth is trapped at that location between the top of the cloth releasing plate and the main body by the tooth ratchet mechanism or what is call a trigger assembly and in the engaged position, it can be used for mopping and cleaning surfaces and once the cloth has become dirty and needs to be replaced, the engaging mechanism as already described will be triggered and released so that the cloth releasing plate will move the distance D1 as described and then the cloth will be free from its entrapment and will fall away into a waste disposal container. The advantage of this embodiment is that it eliminates the necessity of the engaging members such as hook and loop fasteners or any spikes on the bottom.

The entire trigger mechanism can also be modified in the following way. The central member that is engaged replaces the notched collar with a threaded bolt which contains threads that can be engaged by a tooth instead of notches that can be engaged by a tooth. The threaded bolt rests within a housing chamber and passes through a opening in the housing and is screwed into the cloth releasing plate so that it is affixed to the cloth releasing plate and will travel with it. The mechanism to release the cloth releasing plate is again the pivot post originally described as 80 and 82 which support compression force springs 120 and 130 as previously described and are retained at their top end by threaded screws which serve to retain the compression force springs into the housing so that when the mechanism is released, the compression force springs do not fly away but instead, are retained within the housing. The threaded bolt has a top head which is wider than the body of the bolt so as the threaded bolt moves within the chamber and through the opening in the housing which replaces the chamber of the notched collar, the threaded bolt will move downwardly until the head abuts the interior surface of the housing chamber. Therefore, the housing will have a central chamber to accommodate the threaded bolt and the threaded bolt will extend through an opening in the bottom of the housing so that it is free to move downwardly by a given distance such as D1 which can be three-quarters (¾) inch to one (1) inch so that when the trigger mechanism is disengaged, the force compression springs all cause the threaded bolt will move downwardly taking the cloth releasing plate with it until the head comes to rest against the interior surface of the bottom of the chamber which prevents further movement of the threaded bolt and also further movement of the cloth releasing plate but disengages the disposable cloth from the method by which it was attached to the main plate so the cloth can be disposed of in a waste receptacle. While the trigger mechanism can also be on top of the housing as discussed in detail in the present application, it is also within the spirit and scope of the present invention for the trigger mechanism to be on the side of the housing. The trigger mechanism will look approximately the same as the current trigger mechanism but instead of the tooth engaging the threaded bolt threads from the top down, it will instead engage it from a side position. However, the biasing spring will now be on the side of the housing and again, the force to disengage the tooth will be the same type of mechanism except it will be on the side rather than on the top.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A hand operated sweeping mop applicator, comprising:
   a. a main body having an upper surface including an affixation member used in conjunction with retaining a handle, respective top surfaces of four disposable cloth retaining members with two disposable cloth retaining members on a right side of the main body and two disposable cloth retaining members on an opposite left side of the main body each disposable cloth retaining member having a respective bottom surface respectively retaining a disposable cloth retaining member on their respective bottom surfaces;
   b. the top surface of the main body having a right housing member with a top surface and a sidewall with a transverse opening, a hollow interior with an open bottom leading to the hollow interior, a right cloth releasing plate having a top surface having a right notched collar and a pair of right spring supporting pins on opposite sides of the right notched collar which support right compression force springs affixed to an interior upper surface of the right housing, the right notched collar having a retaining notch into which a retaining tooth is engaged, the right half of the cloth releasing plate having a pair of openings which are respectively sized to encircle the bottom of each respective cloth retaining member on the right bottom side of the main body,
   c. the top surface of the main body having a left housing member with a top surface and a sidewall with a transverse opening, a hollow interior with an open bottom leading to the hollow interior, a left cloth releasing plate having a top surface having a left notched collar and a pair of left spring supporting pins on opposite sides of the left notched collar which support left compression force springs affixed to an interior upper surface of the left housing, the left notched collar having a retaining notch into which a retaining tooth is engaged, the left half of the cloth releasing plate having a pair of openings which are respectively sized to encircle the bottom of each respective cloth retaining member on the left bottom side of the main body,
   d. the right housing further including a right guide pin having a longitudinal shaft with a widened base inserted into an interior chamber of the right notched collar so that a bottom of the widened base is aligned with a bottom of the right notched collar and the longitudinal shaft extends through an opening in a top of the right notched collar, the longitudinal shaft having an opening above the top of the right notched collar for receiving a right transverse retaining pin which terminates at one end in an opening in the right housing and abuts an interior wall of the right housing at an opposite end of the right transverse retaining pin so that the guide pin remains stationary, a given travel distance between the widened base of the right guide pin and an interior top surface of the top of the right notched collar, each spring retaining pin having a respective collar to enable each spring retaining pin to better support a compression force spring;
   e. the left housing further including a left guide pin having a longitudinal shaft with a widened base inserted into an interior chamber of the left notched collar so that a bottom of the widened base is aligned with a bottom of the left notched collar and the longitudinal shaft extends through an opening in a top of the left notched collar, the longitudinal shaft having an opening above the top of the left notched collar for receiving a left transverse retaining pin which terminates at one end in an opening in the left housing and abuts an interior wall of the left housing at an opposite end of the left transverse retaining pin so that the guide pin remains stationary, a given travel distance between the widened base of the left guide pin and an interior top surface of the top of the left notched collar, each spring retaining pin having a respective collar to enable each spring retaining pin to better support a compression force spring;

f. the right and left housing members each having a respective spring biased retaining tooth which engage a notch of a respective notched collar to respectively retain the right and left cloth releasing plate onto the bottom of the main body, the right housing having a right trigger mechanism comprising a right press button having a bottom surface affixed to a right biasing spring at its top end, the right biasing spring affixed at its bottom end to the top surface of the right housing and a right press button having a top surface and a sidewall, a bent arm affixed at a proximal end to the sidewall, the bent arm terminating at its distal end in an engaging tooth which extends through the transverse opening in the right housing and engages the notch in the right notched collar, the bent arm attached to a pivot collar through which a pivot pin extends, the pivot pin retained by support members on the top of the right housing, similarly, there is a left trigger mechanism comprising a left press button having a bottom surface affixed to a second biasing spring at its top end, the second biasing spring affixed at its bottom end to the top surface of the left housing and the left press button having a top surface and a sidewall, a bent arm affixed at a proximal end to the sidewall, the bent arm terminating at its distal end in a left engaging tooth which extends through the transverse opening in the second housing and engages the notch in the corresponding left notched collar within the left housing the bent arm attached to a pivot collar through which a pivot pin extends, the pivot pin retained by support members on the top of the left housing;

g. a disposable cloth retained onto a respective bottom of the right and left cloth releasing plate by the attaching members of the four attaching plates; and k. in operation the spring biased teeth assemblies having their respective engaging teeth respectively engaging a notch in each notched collar in a respective right and left housing, the teeth engaging the notches by the force of the respective biasing springs pushing on a respective press button to overcome a downward force of the compression force springs, the hand operated sweeping mop applicator is used with the cleaning cloth rubbed against a surface such as a floor to remove dust and dirt and when the cleaning cloth becomes a dirty cleaning cloth it is necessary to replace it by thumbs of a left and right hand pressing down on the top surfaces of the left and right press buttons to overcome the force of the biasing springs, causing the bent arm sections to rotate about the pivot pin in a clockwise direction so that the engaging teeth are disengaged from a respective notch in a respective notched collar in the right and left housings, as a result of the disengagement of the engaging teeth from respective notches on respective right and left notched collars, the compression force springs exert a downward force on the right and left cloth releasing plates, the downward force is stopped by the widened base of each respective guide pin abutting against a respective bottom surface of a top of a respective right and left notched collar, so that the right and left cloth releasing plates move a distance from the main plate, the downward travel distance resulting in the dirty cleaning cloth being disengaged from the cloth retaining members and falls away from the right and left cloth releasing plates and into a wastebasket without the user's hands ever touching the dirty cleaning cloth.

2. A hand operated sweeping mop applicator, comprising:

a. a main body having an upper surface including an affixation member used in conjunction with retaining a handle, respective top surfaces of at least two disposable cloth retaining members with at least one disposable cloth retaining member on a right side of the main body and at least one disposable cloth retaining members on an opposite left side of the main body, each disposable cloth retaining member having a respective bottom surface respectively retraining a disposable cloth retaining members on its respective bottom surfaces;

b. the top surface of the main body having a right housing member with a top surface and a sidewall with access to a hollow interior with an open bottom leading to the hollow interior, a single piece cloth releasing plate having a right cloth releasing plate section having a top surface having a right notched collar and at least one spring supporting pin adjacent the right notched collar which support at least one right compression force spring affixed to an interior upper surface of the right housing, the right notched collar having a retaining notch into which a retaining tooth is engaged, the right cloth releasing plate section of the single piece cloth releasing plate having at least one opening which is sized to encircle a bottom of a cloth retaining member on the right bottom side of the main body, c. the top surface of the main body having a left housing member with a top surface and a sidewall with access to a hollow interior with an open bottom leading to the hollow interior, the single piece cloth releasing plate having a left cloth releasing plate section having a top surface having a left notched collar and at least one left spring supporting pin adjacent to the left notched collar which supports at least one left compression force spring affixed to an interior upper surface of the left housing, the left notched collar having a retaining notch into which a retaining tooth is engaged, the left cloth releasing plate section having at least one opening which is sized to encircle a bottom of a cloth retaining member on the left bottom side of the main body, d. the right housing further including a mechanism to limit travel of the right cloth releasing plate section away from the main body, the left housing further including a mechanism to limit travel of the left cloth releasing plate section away from the main body;

e. the right and left housing members each having a respective spring biased retaining tooth which engage a notch of a respective notched collar to respectively retain the right and left cloth releasing plate onto the bottom of the main body, the right housing having a right trigger mechanism including a right biasing spring causing an upward force on a trigger member affixed to an arm terminating at its distal end in an engaging tooth which extends through the right housing and engages the notch in the right notched collar, the arm attached to a pivot collar through which a pivot pin extends, the pivot pin retained by support members on the right housing, similarly, there is a left trigger mechanism including a left biasing spring causing an upward force on a trigger member affixed to an arm terminating at its distal end in an engaging tooth which extends through second housing and engages the notch in the corresponding left notched collar within the left housing the arm attached to a pivot collar through which a pivot pin extends, the pivot pin retained by support members on the top of the left housing;

f. a disposable cloth retained onto a respective bottom of the cloth releasing plate and its right and left sections by the attaching members of the two attaching plates; and g. in operation the spring biased teeth assemblies having their respective engaging teeth respectively engaging a notch in each notched collar in a respective right and left housing, the teeth engaging the notches by the force of the respective biasing springs pushing on a respective trigger member to overcome a downward force of the compression force springs, when it is necessary to replace the cleaning cloth, downward pressure on the trigger mechanism overcomes the force of the biasing springs, causing the arm sections to rotate about the pivot pin in a clockwise direction so that the engaging teeth are disengaged from a respective notch in a respective notched collar in the right and left housings, as a result of the disengagement of the engaging teeth from respective notches on respective right and left notched collars, the compression force springs exert a downward force on the right and left cloth releasing plate sections, the downward force is stopped by the widened base of each respective guide pin abutting against a respective bottom surface of a top of a respective right and left notched collar, so that the right and left cloth releasing plate sections of the single piece cloth releasing plate move a distance from the main plate, the downward travel distance resulting in the cleaning cloth being disengaged from the cloth retaining members and falls away from the right and left cloth releasing plate sections and into a wastebasket without the user's hands ever touching the cleaning cloth.

3. The hand operated sweeping mop applicator in accordance with claim 2, further comprising: the right and left releasing cloth plate sections are formed in one piece.

4. A hand operated sweeping mop applicator, comprising:

a. a main body having respective top surfaces of at least two disposable cloth retaining members with at least one disposable cloth retaining member on a right side of the main body and at least one disposable cloth retaining members on an opposite left side of the main body, each disposable cloth retaining member having a respective bottom surface respectively retaining a disposable cloth retaining member on its respective bottom surfaces;

b. the top surface of the main body having a right housing member with a top surface and a sidewall with a transverse opening, a hollow interior with an open bottom leading to the hollow interior, a single piece cloth releasing plate having a right cloth releasing plate section having a top surface having a right notched collar and at least one spring supporting pin adjacent the right notched collar which support at least one right compression force spring affixed to an interior upper surface of the right housing, the right notched collar having a retaining notch into which a retaining tooth is engaged, the right half section of the cloth releasing plate having at least one opening which is sized to encircle a bottom of a cloth retaining member on the right bottom side of the main body, c. the top surface of the main body having a left housing member with a top surface and a sidewall with a transverse opening, a hollow interior with an open bottom leading to the hollow interior, the single cloth releasing plate having a left cloth releasing plate section having a top surface having a left notched collar and at least one left spring supporting pin adjacent to the left notched collar which supports at least one left compression force spring affixed to an interior upper surface of the left housing, the left notched collar having a retaining notch into which a retaining tooth is engaged, the left half cloth releasing plate section having at least one opening which is sized to encircle a bottom of a cloth retaining member on the left bottom side of the main body, d. the right housing further including a right guide pin having a longitudinal shaft with a widened base inserted into an interior chamber of the right notched collar so that a bottom of the widened base is aligned with a bottom of the right notched collar and the longitudinal shaft extends through an opening in a top of the right notched collar, the longitudinal shaft having an opening above the top of the right notched collar for receiving a right transverse retaining pin which terminates at one end in an opening in the right housing and abuts an interior wall of the right housing at an opposite end of the right transverse retaining pin so that the guide pin remains stationary, a given travel distance between the widened base of the right guide pin and an interior top surface of the top of the right notched collar;

e. the left housing further including a left guide pin having a longitudinal shaft with a widened base inserted into an interior chamber of the left notched collar so that a bottom of the widened base is aligned with a bottom of the left notched collar and the longitudinal shaft extends through an opening in a top of the left notched collar, the longitudinal shaft having an opening above the top of the left notched collar for receiving a left transverse retaining pin which terminates at one end in an opening in the left housing and abuts an interior wall of the left housing at an opposite end of the left transverse retaining pin so that the guide pin remains stationary, a given travel distance between the widened base of the left guide pin and an interior top surface of the top of the left notched collar;

f. the right and left housings each having a respective spring biased retaining tooth which engage a notch of a respective notched collar to respectively retain the right and left cloth releasing plate onto the bottom of the main body, the right housing having a right trigger mechanism including a right biasing spring causing an upward force on a trigger member affixed to an arm terminating at its distal end in an engaging tooth which extends through the transverse opening in the right housing and engages the notch in the right notched collar, the arm attached to a pivot collar through which a pivot pin extends, the pivot pin retained by support members on the top of the right housing, similarly, there is a left trigger mechanism including a left biasing spring causing an upward force on a trigger member affixed to an arm terminating at its distal end in an engaging tooth which extends through transverse opening in the second housing and engages the notch in the corresponding left notched collar within the left housing the arm attached to a pivot collar through which a pivot pin extends, the pivot pin retained by support members on the top of the left housing;

g. a disposable cloth retained onto a respective bottom of the right and left cloth releasing plate by the attaching members of the two attaching plates; and h. in operation the spring biased teeth assemblies having their respective engaging teeth respectively engaging a notch in each notched collar in a respective right and left housing, the teeth engaging the notches by the force of the respective biasing springs pushing on a respective trigger member to overcome a downward force of the compression force springs, when it is necessary to replace the cleaning cloth, downward pressure on the trigger mechanism overcomes the force of the biasing springs, causing the arm sections to rotate about the pivot pin in a clockwise direction so that the engaging teeth are disengaged from a respective notch in a respective notched collar in the right and left housings, as a result of the disengagement of the engaging teeth from respective notches on respective right and left notched collars, the compression force springs exert a downward force on the right and left cloth releasing plates, the downward force is stopped by the widened base of each respective guide pin abutting against a respective bottom surface of a top of a respective right and left notched collar, so that the right and left cloth releasing plate section move a distance from the main plate, the downward travel distance resulting in the cleaning cloth being disengaged from the right and left cloth retaining member sections and falls away from the right and left cloth releasing plates and into a wastebasket without the user's hands ever touching the cleaning cloth.

5. The hand operated sweeping mop in accordance with claim 4, further comprising: the right mop releasing section and left mop releasing section are formed in one piece.

* * * * *